US012645352B2

(12) United States Patent
Sakhartchouk et al.

(10) Patent No.: US 12,645,352 B2
(45) Date of Patent: Jun. 2, 2026

(54) UPGRADING LEGACY DEVICES TO MATTER

(71) Applicant: Google LLC, Mountain View, CA (US)

(72) Inventors: Alexei Sakhartchouk, Waterloo (CN);
David Roy Schairer, San Jose, CA
(US); Junjie Bu, Pleasanton, CA (US);
Emil John Feig, Redwood City, CA
(US)

(73) Assignee: Google LLC, Mountain View, CA (US)

( * ) Notice: Subject to any disclaimer, the term of this
patent is extended or adjusted under 35
U.S.C. 154(b) by 4 days.

(21) Appl. No.: 18/847,047

(22) PCT Filed: May 8, 2023

(86) PCT No.: PCT/US2023/066730
§ 371 (c)(1),
(2) Date: Sep. 13, 2024

(87) PCT Pub. No.: WO2023/220562
PCT Pub. Date: Nov. 16, 2023

(65) Prior Publication Data
US 2025/0202729 A1 Jun. 19, 2025

Related U.S. Application Data

(60) Provisional application No. 63/364,468, filed on May
10, 2022.

(51) Int. Cl.
*G06F 3/04842* (2022.01)
*G06F 3/041* (2006.01)
(Continued)

(52) U.S. Cl.
CPC ........ *G06F 3/04842* (2013.01); *G06F 3/0416*
(2013.01); *G06F 3/0441* (2019.05);
(Continued)

(58) Field of Classification Search
CPC .. G06F 3/04842; G06F 3/0416; G06F 3/0441;
G06F 3/0442; G06F 2203/04101;
(Continued)

(56) References Cited

U.S. PATENT DOCUMENTS 8,965,952 B1 * 2/2015 Shatalin ................. G06F 9/541
709/217
9,241,270 B1 1/2016 Logue
(Continued)

FOREIGN PATENT DOCUMENTS

WO 2023220562 11/2023

OTHER PUBLICATIONS

"International Search Report and Written Opinion", Application No.
PCT/US2023/066730, Aug. 29, 2023, 12 pages.
(Continued)

*Primary Examiner* — El Hadji M Sall
(74) *Attorney, Agent, or Firm* — Colby Nipper PLLC

(57) ABSTRACT

Techniques and devices for upgrading a joining device to
join a Matter network are described in which a first cloud
service receives a first request message from a second cloud
service, the first request message including an identifier of
the joining device to commission to the Matter network. The
first cloud service sends a second request message, to the
second cloud service, to open a commissioning window for
the joining device, the sending causing the second cloud
service to send a message to the joining device to cause the
joining device to open the commissioning window. The first
cloud service receives, from the second cloud service, an
onboarding payload, forwards the onboarding payload to a
hub node, the forwarding causing the hub node to commis-
sion the joining device to the Matter network.

20 Claims, 7 Drawing Sheets

(51) Int. Cl.
    *G06F 3/044*         (2006.01)
    *H04L 12/28*       (2006.01)
    *H04L 67/10*       (2022.01)

(52) U.S. Cl.
    CPC ........ *G06F 3/0442* (2019.05); *H04L 12/2809*
    (2013.01); *H04L 12/281* (2013.01); *H04L*
    *67/10* (2013.01); *G06F 2203/04101* (2013.01);
    *G06F 2203/04106* (2013.01)

(58) Field of Classification Search
    CPC . G06F 2203/04106; G06F 2203/04108; G06F
    3/04812; G06F 3/0488; G06F 3/04883;
    H04L 12/2809; H04L 12/281; H04L
    67/10; H04W 4/70; H04W 12/009; H04W
    84/12; H04W 12/50; H04W 4/33; H04W
    4/38
    See application file for complete search history.

(56) References Cited

U.S. PATENT DOCUMENTS

| | | | | |
|---|---|---|---|---|
| 10,932,183 | B1 * | 2/2021 | Strong | H04W 48/12 |
| 2013/0232554 | A1 * | 9/2013 | Campagna | H04L 63/126 |
| | | | | 726/4 |
| 2016/0105424 | A1 | 4/2016 | Logue et al. | |
| 2017/0126489 | A1 * | 5/2017 | Schiff | H04L 67/10 |
| 2017/0171231 | A1 * | 6/2017 | Reybok, Jr. | H04L 63/1433 |
| 2017/0309142 | A1 * | 10/2017 | Phillips | G08B 13/1672 |
| 2018/0173519 | A1 * | 6/2018 | Enns | H04W 76/10 |
| 2021/0400490 | A1 * | 12/2021 | Wu | H04W 12/106 |

OTHER PUBLICATIONS

"International Preliminary Report on Patentability", Application No. PCT/US2023/066730, Nov. 7, 2024, 9 pages.

* cited by examiner

Figure 1:
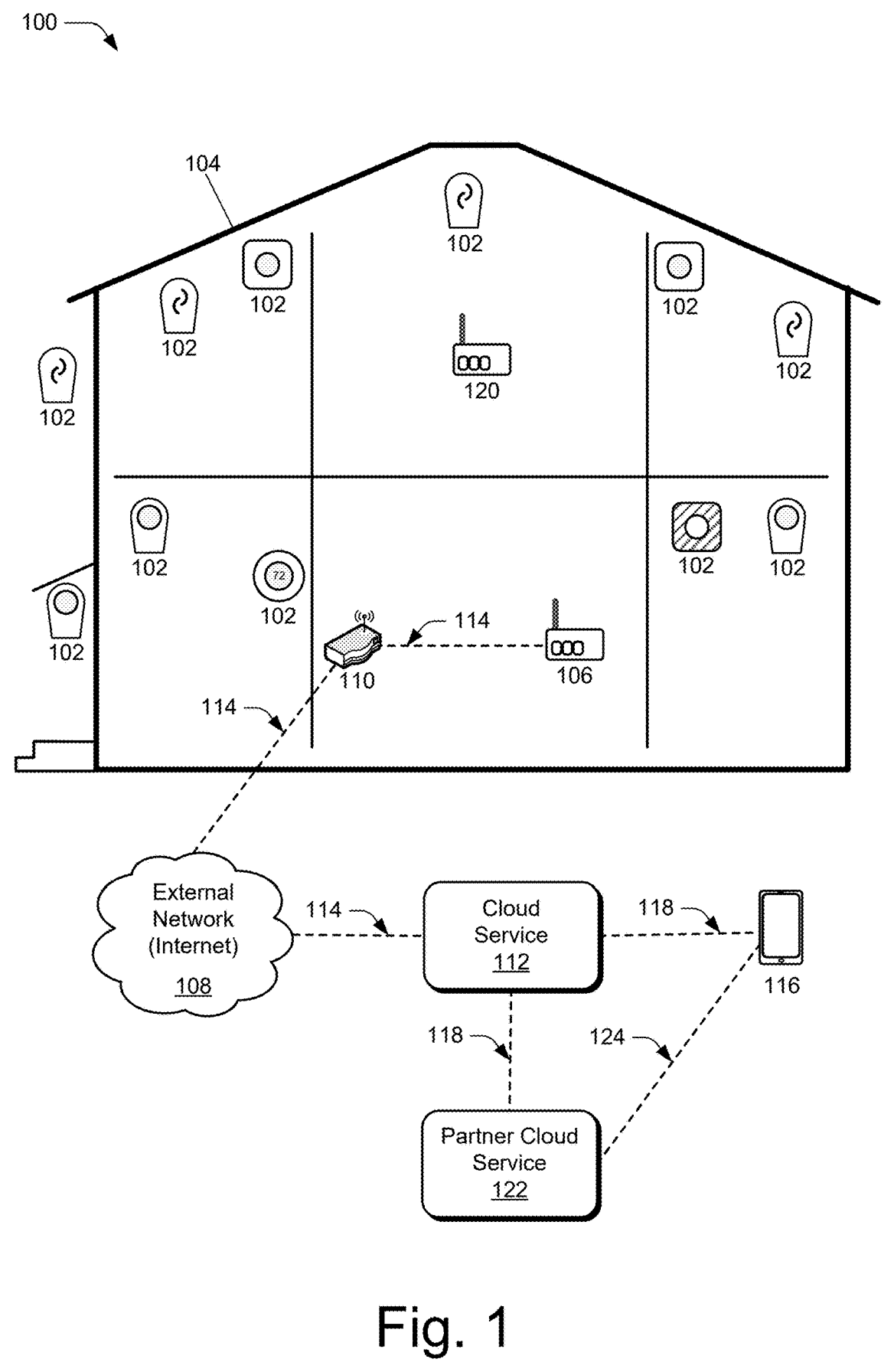

100

104

102

102

102

102

120

102

102

102

102

102

72

102

114

110

106

102

102

114

External Network (Internet)
108

114

Cloud Service
112

118

118

124

116

118

Partner Cloud Service
122

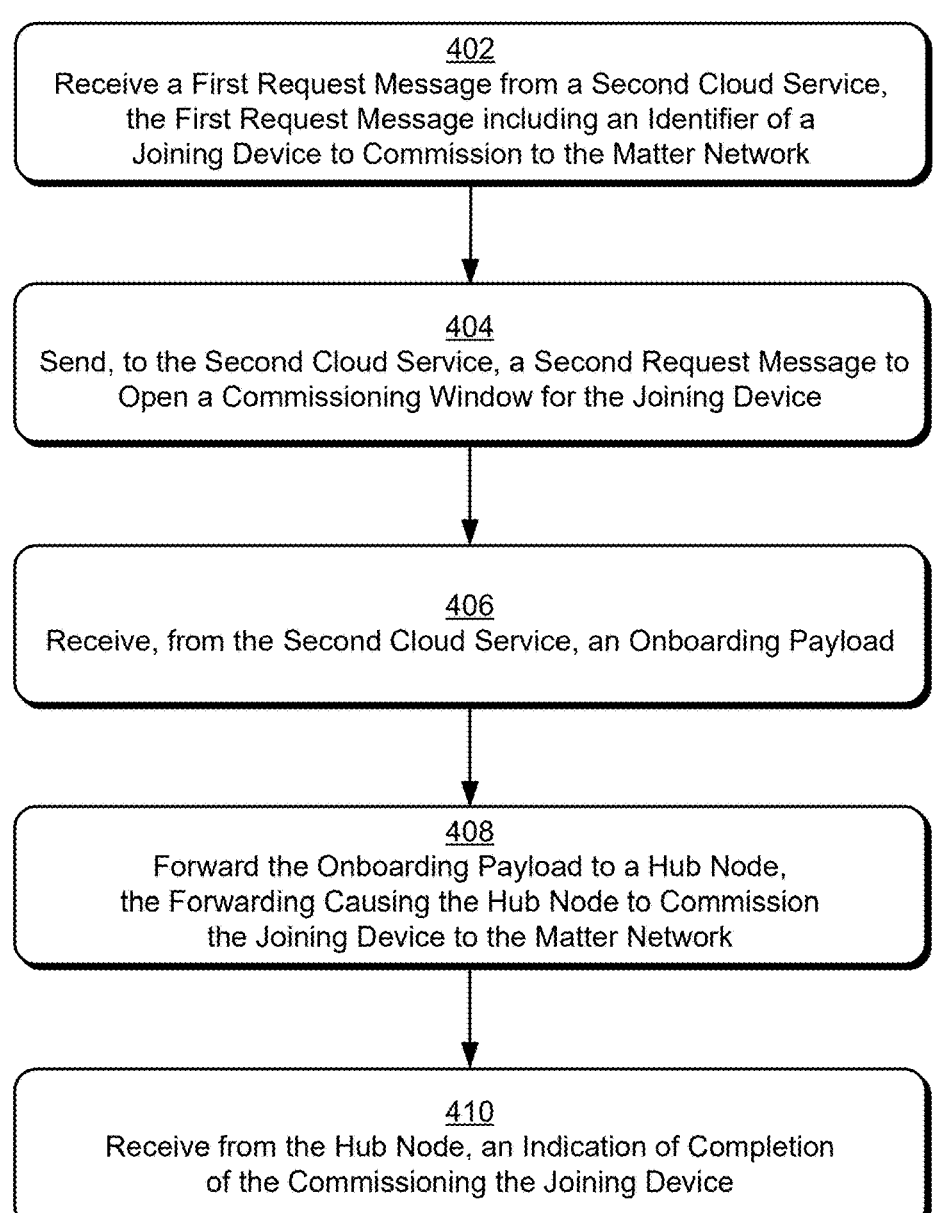

402
Receive a First Request Message from a Second Cloud Service,
the First Request Message including an Identifier of a
Joining Device to Commission to the Matter Network

404
Send, to the Second Cloud Service, a Second Request Message to
Open a Commissioning Window for the Joining Device

406
Receive, from the Second Cloud Service, an Onboarding Payload

408
Forward the Onboarding Payload to a Hub Node,
the Forwarding Causing the Hub Node to Commission
the Joining Device to the Matter Network

410
Receive from the Hub Node, an Indication of Completion
of the Commissioning the Joining Device

HVAC

514

Pool Heater

528

Irrigation System

530

External
Network
(Internet)

108

Cloud
Service

112

600 —

700

Platform
726

Services
728

Resources
730

Cloud
724

Device
702

Computer-Readable
Storage Memory
712

Device
Data
706

Device
Applications
714

Commissioning
Application
716

Input / Output
Interfaces
708

Processing
System
710

Audio / Video
System
718

Communication
Devices
704

Audio
Device
720

Display
Device
722

UPGRADING LEGACY DEVICES TO MATTER

RELATED APPLICATION(S)

This application is a national stage entry of International Application No. PCT/US2023/066730, filed May 8, 2023, which claims the benefit of U.S. Provisional Application No. 63/364,468, filed May 10, 2022, the disclosures of which are incorporated herein by reference in their entirety.

BACKGROUND

Using networking to connect devices to each other and to cloud-based services is increasingly popular for sensing environmental conditions, controlling equipment, and providing information and alerts to users for residential and commercial buildings. Many devices on wireless networks are designed to operate for extended periods of time on battery-power which limits the available computing, user interface, and radio resources in the devices.

This increasing popularity has led to multiple vendor-specific ecosystems of devices and networking protocols that may not interoperate. To improve the user experience for these devices and networks, standards, such as the Matter standard, are under development to provide interoperability between devices and services of multiple vendors. Many legacy devices are capable of operating on a Matter network and there are opportunities to upgrade these legacy devices to Matter without user intervention while maintaining privacy and security for the user and their devices.

SUMMARY

This summary is provided to introduce simplified concepts of upgrading legacy devices to Matter, generally related to generating a unique identifier for a network device. The simplified concepts are further described below in the Detailed Description. This summary is not intended to identify essential features of the claimed subject matter, nor is it intended for use in determining the scope of the claimed subject matter.

In aspects, methods, devices, systems, and means for upgrading legacy devices to join a Matter network are described in which a first cloud service receives a first request message from a second cloud service, the first request message including an identifier of a joining device to commission to the Matter network. The first cloud service sends a second request message to the second cloud service to open a commissioning window for the joining device which causes the second cloud service to send a message to the joining device to cause the joining device to open the commissioning window. The first cloud service receives, from the second cloud service, an onboarding payload, forwards the onboarding payload to a hub node, the forwarding causing the hub node to commission the joining device to the Matter network, and receives from the hub node an indication of completion of the commissioning the joining device.

The details of one or more implementations are set forth in the accompanying drawings and the following description. Other features and advantages will be apparent from the description and drawings and from the claims. This summary is provided to introduce subject matter that is further described in the Detailed Description and Drawings.

Accordingly, this summary should not be considered to describe essential features nor used to limit the scope of the claimed subject matter.

BRIEF DESCRIPTION OF THE DRAWINGS

Aspects of upgrading legacy devices to Matter are described with reference to the following drawings. The same numbers are used throughout the drawings to reference like features and components:

FIG. 1 illustrates an example network environment in which various aspects of upgrading legacy devices to Matter can be implemented.

FIG. 4 illustrates an example method of upgrading legacy devices to Matter as in accordance with aspects of the techniques described herein.

DETAILED DESCRIPTION

Figure 2:
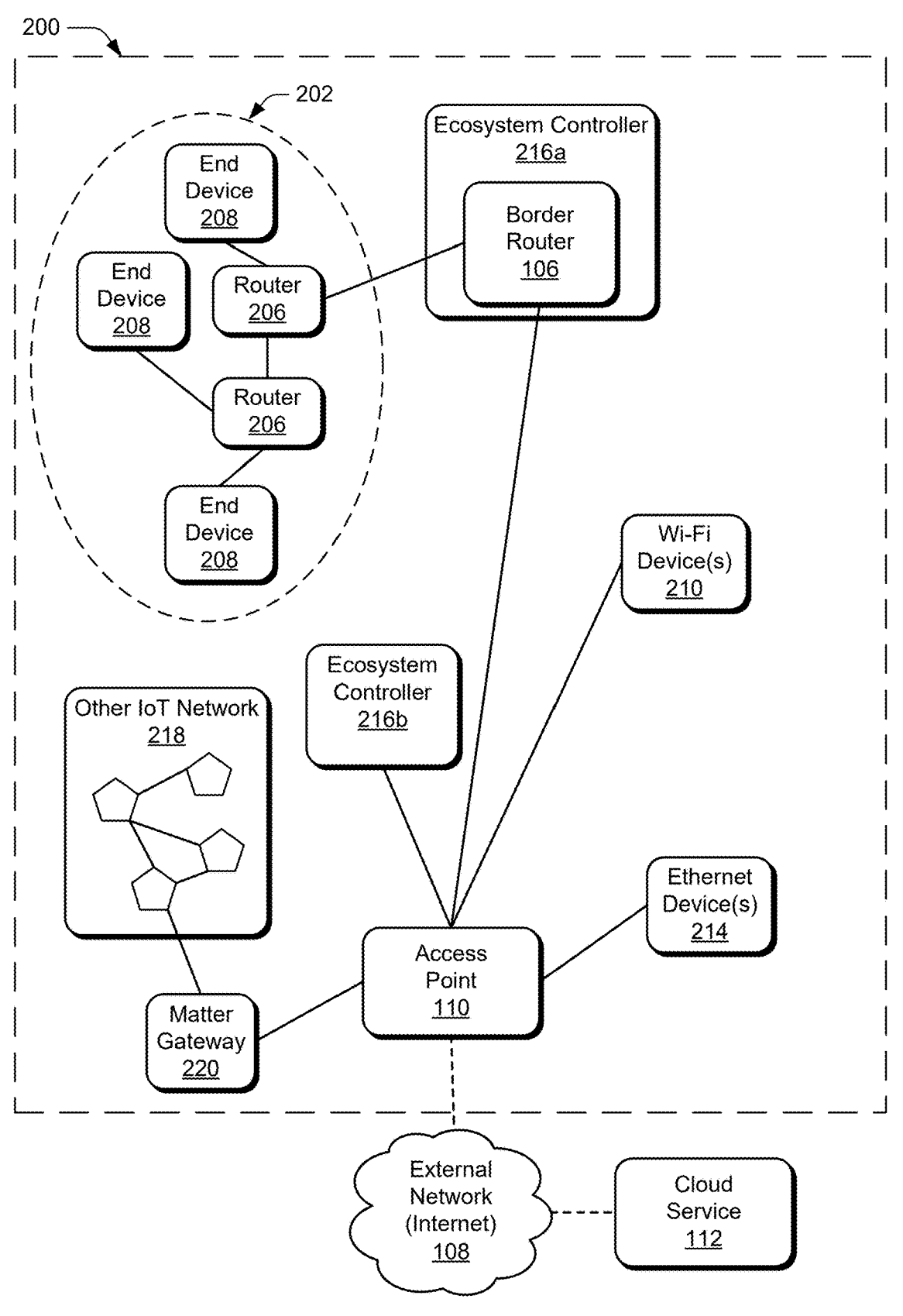
FIG. 2 illustrates an example home area network system in which various aspects of upgrading legacy devices to Matter can be implemented.

This document describes techniques and devices to simplify upgrading legacy smart-home devices to operate on Matter networks without a user performing a factory reset of their device(s), losing metadata, and/or being forced to set up existing devices from scratch. A Matter network may include devices from a single manufacturer that also provides cloud services that support those devices, or the Matter network may also include devices from one or more partners (partner device manufacturers). Each partner may also provide partner cloud services to support their devices in addition to connectivity to the cloud services of the manufacturer and/or the Matter network. Techniques are described to upgrade legacy devices to operate on a Matter network without losing the capability to operate on legacy networks and with legacy services.

According to embodiments of the invention, the first cloud service may provide services to devices on the Matter network, including in particular devices from the manufacturer that provides the first cloud service. The first cloud service may connect to the Matter network via a hub node forming part of the Matter network. By commissioning the joining device, which may be a partner device, to the network, the joining device may be enabled to use services of the first cloud service as well, for instance by communicating with the first cloud service via the hub node.

Example Environment

FIG. 1 illustrates an example network environment 100 in which aspects of upgrading legacy devices to Matter can be implemented. The network environment 100 includes a home area network (HAN) such as a HAN 200, described below with respect to FIG. 2. The HAN includes wireless network devices 102 that are disposed about a structure 104, such as a house, and are connected by one or more wireless and/or wired network technologies, as described below. The HAN includes a border router 106 that connects the HAN to an external network 108, such as the Internet, through a home router or access point 110.

To provide user access to functions implemented using the wireless network devices 102 in the HAN, a cloud service 112 connects to the HAN via border router 106 or a Matter hub device, via a secure tunnel 114 through the external network 108 and the access point 110. The cloud service 112 facilitates communication between the HAN and internet clients 116, such as apps on mobile devices, using a web-based application programming interface (API) 118. The cloud service 112 also manages a home graph that describes connections and relationships between the wireless network devices 102, elements of the structure 104, and users. The home graph may be implemented using any suitable data structure, such as a tree, a relational database, or the like. The cloud service 112 hosts controllers which orchestrate and arbitrate home automation experiences, as described in greater detail below.

The HAN may include one or more wireless network devices 102 that function as a hub 120. The hub 120 may be a general-purpose home automation hub, a network-connected speaker, or an application-specific hub, such as a security hub, an energy management hub, an HVAC hub, and so forth. The functionality of a hub 120 may also be integrated into any wireless network device 102, such as a smart thermostat device or the border router 106. In addition to hosting controllers on the cloud service 112, controllers can be hosted on any hub 120 in the structure 104, such as the border router 106. A controller hosted on the cloud service 112 can be moved dynamically to the hub 120 in the structure 104, such as moving an HVAC zone controller to a newly installed smart thermostat.

Hosting functionality on the hub 120 in the structure 104 can improve reliability when the user's internet connection is unreliable, can reduce latency of operations that would normally have to connect to the cloud service 112, and can satisfy system and regulatory constraints around local access between wireless network devices 102.

The wireless network devices 102 in the HAN may be from a single manufacturer that provides the cloud service 112 as well, or the HAN may include wireless network devices 102 from partners. These partners may also provide partner cloud services 122 that provide services related to their wireless network devices 102 through a partner Web API 124. The partner cloud service 122 may optionally or additionally provide services to internet clients 116 via the web-based API 118, the cloud service 112, and the secure tunnel 114.

The network environment 100 can be implemented on a variety of hosts, such as battery-powered microcontroller-based devices, line-powered devices, and servers that host cloud services. Protocols operating in the wireless network devices 102 and the cloud service 112 provide a number of services that support operations of home automation experiences in the distributed computing environment 100. These services include, but are not limited to, real-time distributed data management and subscriptions, command-and-response control, real-time event notification, historical data logging and preservation, cryptographically controlled security groups, time synchronization, network and service pairing, and software updates.

FIG. 2 illustrates an example home area network system (e.g., Matter network, Weave network, fabric network) in which various aspects of upgrading legacy devices to Matter can be implemented. The home area network (HAN) 200 (Matter network 200) includes a wireless mesh network 202 (e.g., a Thread network) and Wi-Fi device(s) 210. The HAN 200 may also include wired network devices (e.g., Ethernet device(s) 214). The wireless mesh network 202 includes routers 206 and end devices 208. The routers 206 and the end devices 208, each include a mesh network interface for communication over the mesh network 202. The routers 206 receive and transmit packet data over the mesh network interface. The routers 206 also route traffic across the mesh network 202. The end devices 208 are devices that can communicate using the mesh network 202, but lack the capability, beyond simply forwarding to its parent router 206, to route traffic in the mesh network 202. For example, a battery-powered sensor is one type of end device 208. Each Wi-Fi device 210 includes a Wi-Fi network interface for communication over a Wi-Fi network. The Wi-Fi devices 210 and/or the Ethernet devices 214 can include home automation devices as well as devices that include applications to control Matter devices (e.g., a smartphone, a tablet, a network-connected speaker).

An ecosystem controller 216a (e.g., a Matter controller) can include the border router 106, which in turn, is included in the wireless mesh network 202. The border router 106 includes a mesh network interface for communication over the mesh network 202 and a Wi-Fi network interface for communication over the Wi-Fi network 204, or the border router 106 uses the Wi-Fi network interface of the ecosystem controller 216a for communication over the Wi-Fi network 204. The border router 106 routes packets between devices in the wireless mesh network 202 and the access point 110, which can forward packets to other devices in the HAN 200. The border router 106 also routes packets between devices in the mesh network 202 and external network nodes (e.g., the cloud service 112) via the external network 108, such as the Internet, through a home router or access point 110.

The HAN 200 includes one or more ecosystem controllers 216 that provide an interface between devices from an ecosystem vendor and the access point 110. For example, the ecosystem controller 216a provides an interface between the mesh network 202 (a Thread network) and the access point 110. Optionally, the HAN 200 may include other ecosystem controllers, such as ecosystem controller 216b, to interface to devices from other ecosystem vendors. Additionally, other, devices from another IoT network 218 (e.g., non-Matter compatible ecosystem devices) can be connected to the access point 110 by a Matter gateway 220 that provides connectivity for Matter-capable applications to devices in the other IoT network 218.

The devices in the mesh network 202, the Wi-Fi device(s) 210, the Ethernet device(s) 214, the ecosystem controllers 216, and Matter gateway 220 use standard IP routing configurations to communicate with each other through transport protocols such as the User Datagram Protocol (UDP) or the Transmission Control Protocol (TCP).

Upgrading Legacy Devices to Matter

Figure 3:
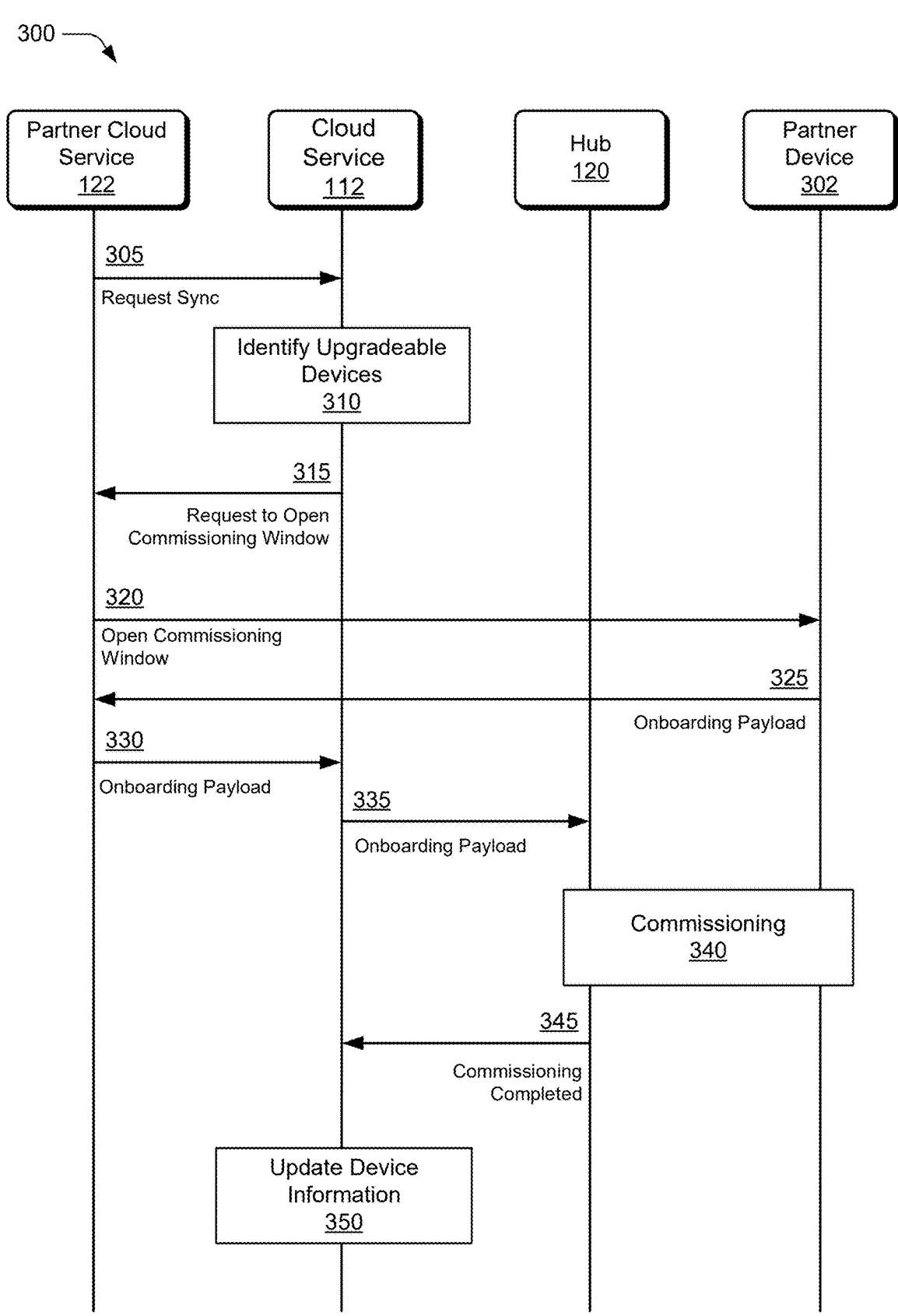
FIG. 3 illustrates example data and control transactions between devices in accordance with aspects of upgrading legacy devices to Matter can be implemented.

FIG. 3 illustrates an example of transactions among various network entities in accordance with aspects of upgrading legacy devices to Matter. In order to enable a legacy partner device 302 (partner node 302) to join a Matter network, the partner device 302 receives an over-the-air firmware update to add Matter support, such as receiving the firmware update from the partner cloud service 122. Once the partner device 302 has successfully updated its firmware, the process of commissioning the partner device 302 to the Matter network can begin.

At 305, the partner cloud service 122 sends a Request Sync message to the cloud service 112 to request an update to device information maintained in the home graph of the cloud service 112. The Request Sync message includes matterUniqueId, matterOriginalVendorId, and matterOriginalProductId fields from the Matter Basic Information Cluster and a MatterUpgradeable trait that indicates that the partner device 302 is compatible with Matter networking. The matterOriginalVendorId is used to resolve upgrades across the home graph. For example, the Request Sync message (including the matterUniqueId, matterOriginalVendorId, and matterOriginalProductId fields and the MatterUpgradeable trait illustrated in a bold font) can be in the form of:

```
{
    "requestId": "ff36a3cc-ec34-11e6-bla0-64510650abcf",
    "payload": {
        "agentUserId": "1836.15267389",
        "devices": [
            {
                "id": "456",
                "type": "action.devices.types.LIGHT",
                "traits": [
                    "action.devices.traits.OnOff",
                    "action.devices.traits.Brightness",
                    "action.devices.traits.ColorSetting",
                    "action.devices.traits.MatterUpgradable"
                ],
                "willReportState": true,
                "roomHint": "office",
                "deviceInfo": { ... },
                "matterUniqueId": "matter-device-id",
                "matterOriginalVendorId": "matter-vid",
                "matterOriginalProductId": "matter-pid",
                "otherDeviceIds": [{
                    "deviceId": "local-device-id",
```

The cloud service 112 uses the parameters in the received Request Sync message to update an existing entry for the partner device 302 in the home graph maintained by the cloud service 112.

At 310, the cloud service 112 periodically scans the home graph to determine if there are Matter upgradeable devices that have not been commissioned to the network fabric supported by the cloud service 112. Additionally, a scan of the home graph may be triggered when the cloud service 112 receives the new MatterUpgradeable trait. Optionally or additionally, the cloud service 112 may limit the number of devices to commission to be less than the number of Matter upgradeable devices found during the scan of the home graph. By limiting the number of devices being commissioned the cloud service 112 reduces the likelihood of reducing network efficiency in the HAN 200 or of over-taxing resources of the hub 120 in the HAN 200. Optionally or additionally, the cloud service 112 may run commissioning tasks during off-hours when users are not actively using devices of the HAN 200, for example, when the occupants of a house are asleep.

If the cloud service 112 determines that there are Matter upgradeable devices, such as the partner device 302, the cloud service 112 sends, at 315, a request to open a commissioning window. The cloud service 112, sends an Execute message including a command OpenForMatterUpgrade to the partner cloud service 122 which communicates with the Matter upgradable device (partner device 302) to cause the partner device 302 to open a commissioning window, at 320. For example, the Execute message (including the command Open ForMatterUpgrade illustrated in a bold font) can be in the form of:

```
{
    "requestId": "ff36a3cc-ec34-11e6-b1a0",
    "inputs": [{
        "intent": "action.devices.EXECUTE",
        "payload": {
            "commands": [{
                "devices": [{
                    "id": "456"
                }],
                "execution": [{
                    "command": "action.devices.commands.OpenForMatterUpgrade"
}}]}}]}
```

The commissioning window is a period of time (e.g., five minutes) that the partner device 302 is available for scanning (e.g., receiving a Multicast Domain Name System (mDNS) broadcast from the hub 120) and commissioning to the Matter network.

At 325, the partner cloud service 122, receives an onboarding payload from the partner device 302, forwards the onboarding payload to the cloud service 112, at 330, which in turn forwards the onboarding payload to the hub 120 at 335. For example, the message to the cloud service 112, at 330, (including the Onboarding payload illustrated in a bold font) can be in the form of:

```
{
  "requestId": "ff36a3cc-ec34-11e6-b1a0",
    "payload":
      "commands": [
        {
          "ids": [
            "456"
          ],
          "status": "SUCCESS",
          "states": {
              "onboardingPayload": "MT:d9e98a4a4b46eb26... "
}}]}}
```

At 340, the hub 120 commissions the partner device 302 to the Matter fabric supported by the cloud server 120 using one or more of the discovery capabilities indicated in a Discovery Capability Bit Mask. The transactions between the hub 120 and the partner device 302 commissioning may include various communications and messages based on the commissioning flow and discovery capabilities specified for the partner device.

At 345, the hub 120 communicates to the cloud service 112 that the commissioning of the partner device 302 is complete which causes the cloud service 112, at 350, to update the home graph and include the partner device 302 in the fabric supported by the cloud service 112. At this point the partner device 302 is now attached as a Matter node to the fabric managed by the cloud service 112 while still retaining all previously configured metadata, including device nicknames, room assignment, and routine participation included in the home graph. The upgrade process maintains the privacy and security of any data previously commissioned or stored in the partner device while establishing a connection between the partner device and the matter network.

If commissioning fails at 340, the cloud service 112 records the failure in the home graph, at 350, and may then choose to route the onboarding payload through a different network path. For example, the cloud service 112 can select a hub in the same home graph as the partner device 302, such as the hub 120 in the HAN 200, and forward a command, using the different network path, to the hub 120 with the onboarding payload to commission the device 302.

Example Method

Example method 400 is described with reference to FIG. 4 in accordance with one or more aspects of upgrading legacy devices to Matter. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the method blocks are described is not intended to be construed as a limitation, and any number of the described method blocks can be combined in any order or skipped to implement a method or an alternate method.

FIG. 4 illustrates example method(s) 400 of upgrading legacy devices to Matter as generally related to a cloud service that manages the commissioning of a joining device to the fabric associated with the Matter network. At block 402, a first cloud service receives a first request message from a second cloud service, the first request message including an identifier of the joining device to commission to the Matter network. For example, a first cloud service (e.g., the cloud service 112) receives a first request message (as described at 305) from a second cloud service (e.g., the partner cloud service 122), the first request message including an identifier of a joining device (e.g., the partner device 302) to commission to the Matter network At block 404, the first cloud service sends, to the second cloud service, a second request message to open a commissioning window for the joining device, the sending causing the second cloud service to send a message to the joining device to cause the joining device to open the commissioning window. For example, the first cloud service sends, to the second cloud service, a second request message (as described at 315) to open a commissioning window for the joining device, the sending causing the second cloud service to send a message to the joining device to cause the joining device to open the commissioning window.

At block 406, the first cloud service receives, from the second cloud service, an onboarding payload. For example, the first cloud service receives, from the second cloud service, an onboarding payload, as described at 320.

At block 408, the first cloud service forwards the onboarding payload to a hub node, the forwarding causing the hub node to commission the joining device to the Matter network. For example, the first cloud service forwards the onboarding payload to a hub node (e.g. the hub 120) at 335, the forwarding causing the hub node to commission the joining device to the Matter network as described at 340.

At block 410, the first cloud service receives, from the hub node, an indication of completion of the commissioning the joining device. For example, the first cloud service receives, from the hub node, an indication of completion of the commissioning the joining device, as described at 345.

Example Environments and Devices

Figure 5:
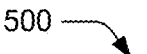
FIG. 5 illustrates an example environment in which a home area network can be implemented in accordance with aspects of the techniques described herein.

FIG. 5 illustrates an example environment 500 in which a home area network 200, as described with reference to FIG. 2, and aspects of upgrading legacy devices to Matter can be implemented. Generally, the environment 500 includes the home area network (HAN) 200 implemented as part of a home or other type of structure with any number of wireless and/or wired network devices that are configured for communication in a wireless network. For example, the wireless network devices can include a thermostat 502, hazard detectors 504 (e.g., for smoke and/or carbon monoxide), cameras 506 (e.g., indoor and outdoor), lighting units 508 (e.g., indoor and outdoor), and any other types of wireless network devices 510 that are implemented inside and/or outside of a structure 512 (e.g., in a home environment). In this example, the wireless network devices can also include any of the previously described devices, such as a border router 106, as well as any of the devices implemented as a router device 206, an end device 208, an ecosystem controller 216, and/or a Matter gateway 220.

In the environment 500, any number of the wireless network devices can be implemented for wireless interconnection to wirelessly communicate and interact with each other. The wireless network devices are modular, intelligent, multi-sensing, network-connected devices that can integrate seamlessly with each other and/or with a central server or a cloud-computing system to provide any of a variety of useful automation objectives and implementations. An example of a wireless network device that can be implemented as any of the devices described herein is shown and described with reference to FIG. 6.

In implementations, the thermostat 502 may include a Nest® Learning Thermostat that detects ambient climate characteristics (e.g., temperature and/or humidity) and controls a HVAC system 514 in the home environment. The learning thermostat 502 and other network-connected devices "learn" by capturing occupant settings to the devices. For example, the thermostat learns preferred temperature set-points for mornings and evenings, and when the occupants of the structure are asleep or awake, as well as when the occupants are typically away or at home.

A hazard detector 504 can be implemented to detect the presence of a hazardous substance or a substance indicative of a hazardous substance (e.g., smoke, fire, or carbon monoxide). In examples of wireless interconnection, a hazard detector 504 may detect the presence of smoke, indicating a fire in the structure, in which case the hazard detector that first detects the smoke can broadcast a low-power wake-up signal to all of the connected wireless network devices. The other hazard detectors 504 can then receive the broadcast wake-up signal and initiate a high-power state for hazard detection and to receive wireless communications of alert messages. Further, the lighting units 508 can receive the broadcast wake-up signal and activate in the region of the detected hazard to illuminate and identify the problem area. In another example, the lighting units 508 may activate in one illumination color to indicate a problem area or region in the structure, such as for a detected fire or break-in, and activate in a different illumination color to indicate safe regions and/or escape routes out of the structure.

In various configurations, the wireless network devices 510 can include an entryway interface device 516 that functions in coordination with a network-connected door lock system 518, and that detects and responds to a person's approach to or departure from a location, such as an outer door of the structure 512. The entryway interface device 516 can interact with the other wireless network devices based on whether someone has approached or entered the smart-home environment. An entryway interface device 516 can control doorbell functionality, announce the approach or departure of a person via audio or visual means, and control settings on a security system, such as to activate or deactivate the security system when occupants come and go. The wireless network devices 510 can also include other sensors and detectors, such as to detect ambient lighting conditions, detect room-occupancy states (e.g., with an occupancy sensor 520), and control a power and/or dim state of one or more lights. In some instances, the sensors and/or detectors may also control a power state or speed of a fan, such as a ceiling fan 522. Further, the sensors and/or detectors may detect occupancy in a room or enclosure and control the supply of power to electrical outlets or devices 524, such as if a room or the structure is unoccupied.

The wireless network devices 510 may also include connected appliances and/or controlled systems 526, such as refrigerators, stoves and ovens, washers, dryers, air conditioners, pool heaters 528, irrigation systems 530, security systems 532, and so forth, as well as other electronic and computing devices, such as televisions, network-connected televisions, network-connected media streaming devices, entertainment systems, computers, intercom systems, garage-door openers 534, ceiling fans 522, control panels 536, and the like. When plugged in, an appliance, device, or system can announce itself to the home area network as described above and can be automatically integrated with the controls and devices of the home area network, such as in the home. It should be noted that the wireless network devices 510 may include devices physically located outside of the structure, but within wireless communication range, such as a device controlling a swimming pool heater 528 or an irrigation system 530.

As described above, the mesh network 202 includes a border router 106 that interfaces for communication with an external network, outside the mesh network 202. The border router 106 connects to an access point 110, which connects to the communication network 108, such as the Internet. A cloud service 112, which is connected via the communication network 108, provides services related to and/or using the devices within the HAN 200. By way of example, the cloud service 112 can include applications for connecting end user devices 538, such as smartphones, tablets, and the like, to devices in the home area network, processing and presenting data acquired in the HAN 200 to end users, linking devices in one or more HANs 200 to user accounts of the cloud service 112, provisioning and updating devices in the HAN 200, and so forth. For example, a user can control the thermostat 502 and other wireless network devices in the home environment using a network-connected computer or portable device, such as a mobile phone or tablet device. Further, the wireless network devices can communicate information to any central server or cloud-computing system via the border router 106, an ecosystem controller 216, a Matter gateway 220, and/or the access point 110. The data communications can be carried out using any of a variety of custom or standard wireless protocols (e.g., Wi-Fi, ZigBee for low power, 6LoWPAN, Thread, BLE, Matter, etc.) and/or by using any of a variety of custom or standard wired protocols (Ethernet, HomePlug, etc.).

Any of the wireless network devices in the HAN 200 can serve as low-power and communication nodes to create the HAN 200 in the home environment. Individual low-power nodes of the network can regularly send out messages regarding what they are sensing, and the other low-powered nodes in the environment—in addition to sending out their own messages—can repeat the messages, thereby communicating the messages from node to node (i.e., from device to device) throughout the home area network. The wireless network devices can be implemented to conserve power, particularly when battery-powered, utilizing low-powered communication protocols to receive the messages, translate the messages to other communication protocols, and send the translated messages to other nodes and/or to a central server or cloud-computing system. For example, an occupancy and/or ambient light sensor can detect an occupant in a room as well as measure the ambient light, and activate the light source when the ambient light sensor 540 detects that the room is dark and when the occupancy sensor 520 detects that someone is in the room. Further, the sensor can include a low-power wireless communication chip (e.g., an IEEE 802.15.4 chip, a Thread chip, a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the home area network, from node to node (i.e., network-connected device to network-connected device) within the home environment as well as over the Internet to a central server or cloud-computing system.

In other configurations, various ones of the wireless network devices can function as "tripwires" for an alarm system in the home environment. For example, in the event a perpetrator circumvents detection by alarm sensors located at windows, doors, and other entry points of the structure or environment, the alarm could still be triggered by receiving an occupancy, motion, heat, sound, etc. message from one or more of the low-powered mesh nodes in the home area network. In other implementations, the home area network can be used to automatically turn on and off the lighting units 508 as a person transitions from room to room in the structure. For example, the wireless network devices can detect the person's movement through the structure and communicate corresponding messages via the nodes of the home area network. Using the messages that indicate which rooms are occupied, other wireless network devices that receive the messages can activate and/or deactivate accordingly. As referred to above, the home area network can also be utilized to provide exit lighting in the event of an emergency, such as by turning on the appropriate lighting units 508 that lead to a safe exit. The light units 508 may also be turned-on to indicate the direction along an exit route that a person should travel to safely exit the structure.

The various wireless network devices may also be implemented to integrate and communicate with wearable computing devices 542, such as may be used to identify and locate an occupant of the structure, and adjust the temperature, lighting, sound system, and the like accordingly. In other implementations, RFID sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques that draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other wireless network devices and sensors in the environment according to rules-based inferencing techniques or artificial intelligence techniques for achieving better performance of these functionalities. In an example relating to a personal health-area, the system can detect whether a household pet is moving toward the current location of an occupant (e.g., using any of the wireless network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the home area network, conforming to the wireless interconnection protocols for communicating on the home area network.

The wireless network devices 510 may also include a network-connected alarm clock 544 for each of the individual occupants of the structure in the home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the home area network based on a unique signature of the person, which is determined based on data obtained from sensors located in the wireless network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 502 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other wireless network devices can use the data to provide other automation objectives, such as adjusting the thermostat 502 so as to pre-heat or cool the environment to a desired setting and turning-on or turning-off the lights 508.

In implementations, the wireless network devices can also be utilized for sound, vibration, and/or motion sensing such as to detect running water and determine inferences about water usage in a home environment based on algorithms and mapping of the water usage and consumption. This can be used to determine a signature or fingerprint of each water source in the home and is also referred to as "audio fingerprinting water usage." Similarly, the wireless network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

The environment 500 may include one or more wireless network devices that function as a hub 546. The hub 546 may be a general-purpose home automation hub, or an application-specific hub, such as a security hub, an energy management hub, an HVAC hub, and so forth. The functionality of a hub 546 may also be integrated into any wireless network device, such as a network-connected thermostat device or the border router 106. Hosting functionality on the hub 546 in the structure 512 can improve reliability when the user's internet connection is unreliable, can reduce latency of operations that would normally have to connect to the cloud service 112, and can satisfy system and regulatory constraints around local access between wireless network devices.

Additionally, the example environment 500 includes a network-connected-speaker 548. The network-connected speaker 548 provides voice assistant services that include providing voice control of network-connected devices. The functions of the hub 546 may be hosted in the network-connected speaker 548. The network-connected speaker 548 can be configured to communicate via the wireless mesh network 202, the Wi-Fi network 204, or both.

Figure 6:
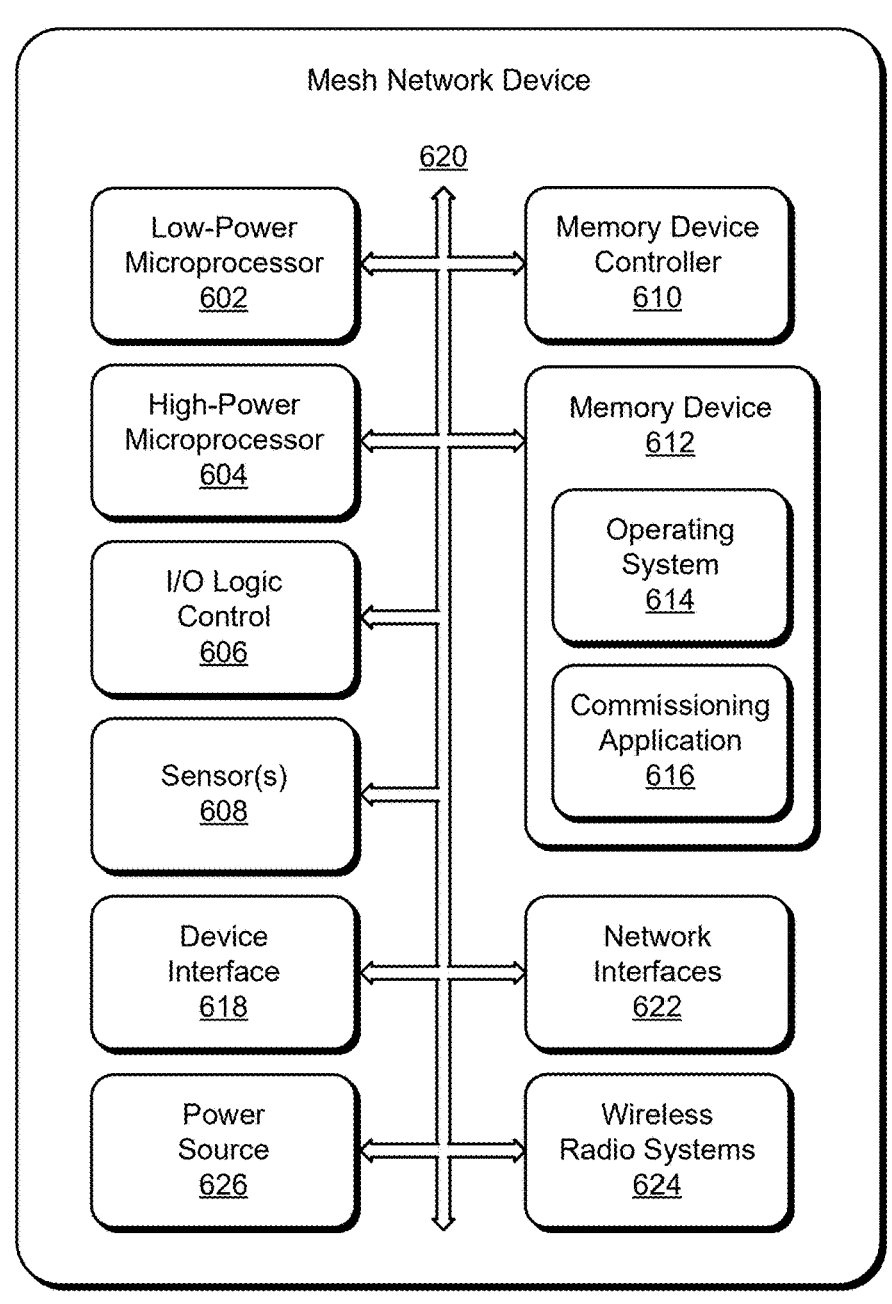
FIG. 6 illustrates an example wireless network device that can be implemented in a home area network environment in accordance with one or more aspects of the techniques described herein.

FIG. 6 illustrates an example wireless network device 600 that can be implemented as any of the wireless network devices in a home area network (Thread network, Matter network) in accordance with one or more aspects of upgrading legacy devices to Matter as described herein. The device 600 can be integrated with electronic circuitry, micropro- cessors, memory, input output (I/O) logic control, commu- nication interfaces and components, as well as other hard- ware, firmware, and/or software to implement the device in a home area network. Further, the wireless network device 600 can be implemented with various components, such as with any number and combination of different components as further described with reference to the example device shown in FIG. 7.

In this example, the wireless network device 600 includes a low-power microprocessor 602 and a high-power micro- processor 604 (e.g., microcontrollers or digital signal pro- cessors) that process executable instructions. The device also includes an input-output (I/O) logic control 606 (e.g., to include electronic circuitry). The microprocessors can include components of an integrated circuit, programmable logic device, a logic device formed using one or more semiconductors, and other implementations in silicon and/or hardware, such as a processor and memory system imple- mented as a system-on-chip (SoC). Alternatively or in addition, the device can be implemented with any one or combination of software, hardware, firmware, or fixed logic circuitry that may be implemented with processing and control circuits. The low-power microprocessor 602 and the high-power microprocessor 604 can also support one or more different device functionalities of the device. For example, the high-power microprocessor 604 may execute computationally intensive operations, whereas the low- power microprocessor 602 may manage less-complex pro- cesses such as detecting a hazard or temperature from one or more sensors 608. The low-power processor 602 may also wake or initialize the high-power processor 604 for compu- tationally intensive processes.

The one or more sensors 608 can be implemented to detect various properties such as acceleration, temperature, humidity, water, supplied power, proximity, external motion, device motion, sound signals, ultrasound signals, light sig- nals, fire, smoke, carbon monoxide, global-positioning-sat- ellite (GPS) signals, radio frequency (RF), other electro- magnetic signals or fields, or the like. As such, the sensors 608 may include any one or a combination of temperature sensors, humidity sensors, hazard-related sensors, security sensors, other environmental sensors, accelerometers, microphones, optical sensors up to and including cameras (e.g., charged coupled-device or video cameras, active or passive radiation sensors, GPS receivers, and radio fre- quency identification detectors. In implementations, the wireless network device 600 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy- efficiency objectives or automation objectives.

The wireless network device 600 includes a memory device controller 610 and a memory device 612, such as any type of a nonvolatile memory and/or other suitable elec- tronic data storage device. The wireless network device 600 can also include various firmware and/or software, such as an operating system 614 that is maintained as computer executable instructions by the memory and executed by a microprocessor. The device software may also include a commissioning application 616 that implements aspects of upgrading legacy devices to Matter. The wireless network device 600 also includes a device interface 618 to interface with another device or peripheral component and includes an integrated data bus 620 that couples the various compo- nents of the wireless network device for data communication between the components. The data bus in the wireless network device may also be implemented as any one or a combination of different bus structures and/or bus architec- tures.

The device interface 618 may receive input from a user and/or provide information to the user (e.g., as a user interface), and a received input can be used to determine a setting. The device interface 618 may also include mechani- cal or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 618 may also receive inputs from any number of peripherals, such as buttons, a keypad, a switch, a micro- phone, and an imager (e.g., a camera device).

The wireless network device 600 can include network interfaces 622, such as a home area network interface for communication with other wireless network devices in a home area network, and an external network interface for network communication, such as via the Internet. The wire- less network device 600 also includes wireless radio systems 624 for wireless communication with other wireless network devices via the home area network interface and for mul- tiple, different wireless communications systems. The wire- less radio systems 624 may include Wi-Fi, Bluetooth™, Mobile Broadband, BLE, and/or point-to-point IEEE 802.15.4. Each of the different radio systems can include a radio device, antenna, and chipset that is implemented for a particular wireless communications technology. The wire- less network device 600 also includes a power source 626, such as a battery and/or to connect the device to line voltage. An AC power source may also be used to charge the battery of the device.

Figure 7:
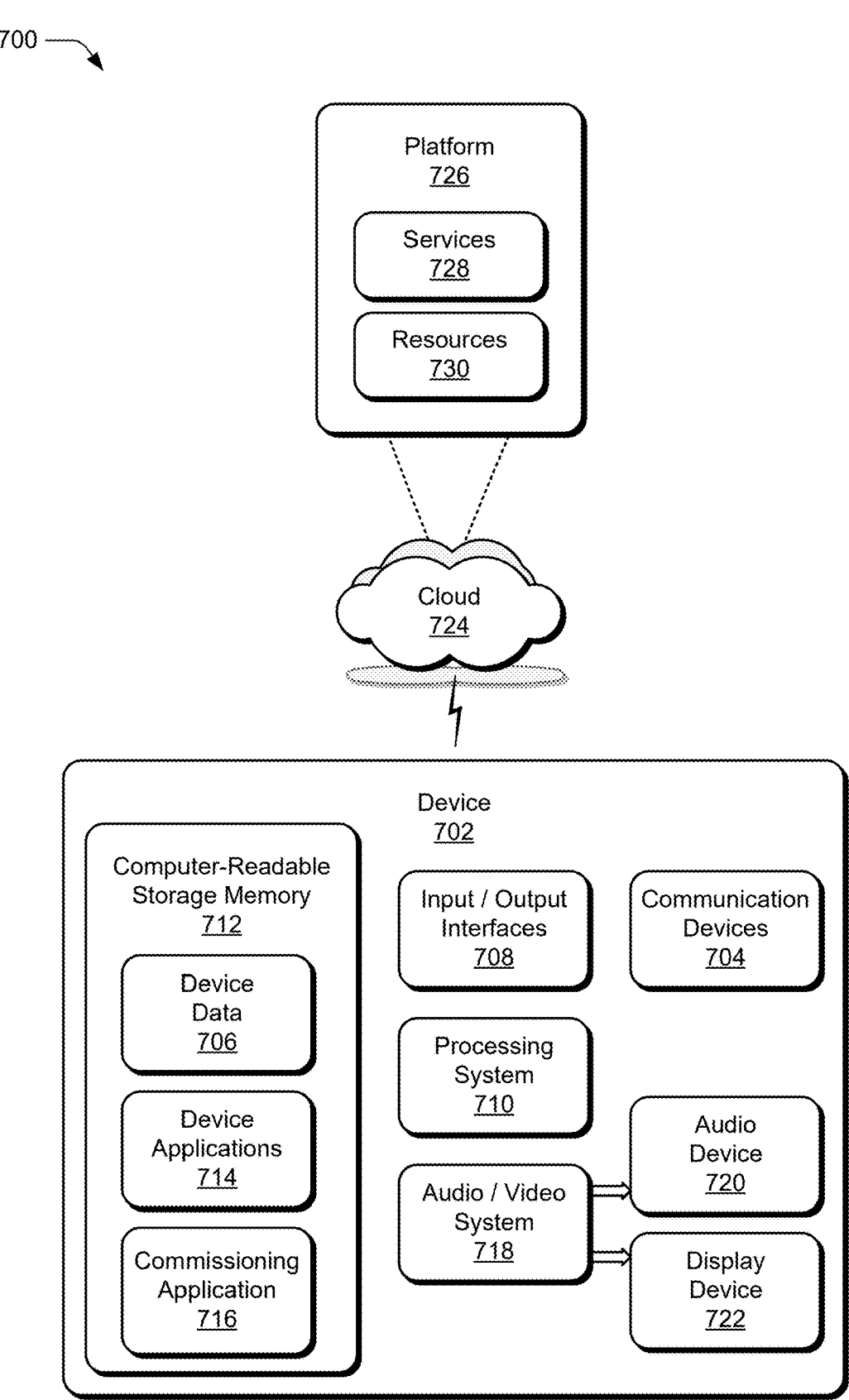
FIG. 7 illustrates an example system with an example device that can implement aspects of upgrading legacy devices to Matter.

FIG. 7 illustrates an example system 700 that includes an example device 702, which can be implemented as any of the wireless network devices that implement aspects of upgrading legacy devices to Matter as described with ref- erence to the previous FIGS. 1-6. The example device 702 may be any type of computing device, client device, mobile phone, tablet, communication, entertainment, gaming, media playback, and/or other type of device. Further, the example device 702 may be implemented as any other type of wireless network device that is configured for communi- cation on a home area network, such as a thermostat, hazard detector, camera, light unit, commissioning device, router, border router, joiner router, joining device, end device, leader, access point, and/or other wireless network devices.

The device 702 includes communication devices 704 that enable wired and/or wireless communication of device data 706, such as data that is communicated between the devices in a home area network, data that is being received, data scheduled for broadcast, data packets of the data, data that is synched between the devices, etc. The device data can include any type of communication data, as well as audio, video, and/or image data that is generated by applications executing on the device. The communication devices 704 can also include transceivers for cellular phone communi- cation and/or for network data communication.

The device 702 also includes input/output (I/O) interfaces 708, such as data network interfaces that provide connection and/or communication links between the device, data net- works (e.g., a home area network, external network, etc.), and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of communication data, as well as audio, video, and/or image data received from any content and/or data source.

The device 702 includes a processing system 710 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 702 may further include any type of a system bus or other data and command transfer system that couples the various components within the device. A system bus can include any one or combination of different bus structures and architectures, as well as control and data lines.

The device 702 also includes computer-readable storage memory 712 (computer-readable storage media 712), such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 712 provides storage of the device data 706 and various device applications 714, such as an operating system that is maintained as a software application with the computer-readable storage memory and executed by the processing system 710. The device applications may also include a device manager, such as any form of a control application, software application, signal processing and control module, code that is native to a particular device, a hardware abstraction layer for a particular device, and so on. In this example, the device applications also include a commissioning application 716 that implements aspects of upgrading legacy devices to Matter, such as when the example device 702 is implemented as any of the wireless network devices described herein.

The device 702 also includes an audio and/or video system 718 that generates audio data for an audio device 720 and/or generates display data for a display device 722. The audio device and/or the display device include any devices that process, display, and/or otherwise render audio, video, display, and/or image data, such as the image content of a digital photo. In implementations, the audio device and/or the display device are integrated components of the example device 702. Alternatively, the audio device and/or the display device are external, peripheral components to the example device. In aspects, at least part of the techniques described for common interface for upgrading legacy devices to Matter may be implemented in a distributed system, such as over a "cloud" 724 in a platform 726. The cloud 724 includes and/or is representative of the platform 726 for services 728 and/or resources 730.

The platform 726 abstracts underlying functionality of hardware, such as server devices (e.g., included in the services 728) and/or software resources (e.g., included as the resources 730), and connects the example device 702 with other devices, servers, etc. The resources 730 may also include applications and/or data that can be utilized while computer processing is executed on servers that are remote from the example device 702. Additionally, the services 728 and/or the resources 730 may facilitate subscriber network services, such as over the Internet, a cellular network, or Wi-Fi network. The platform 726 may also serve to abstract and scale resources to service a demand for the resources 730 that are implemented via the platform, such as in an interconnected device aspect with functionality distributed throughout the system 700. For example, the functionality may be implemented in part at the example device 702 as well as via the platform 726 that abstracts the functionality of the cloud 724.

In the following some examples are described:

Example 1: A method of commissioning a joining device to a Matter network, the method comprising:

receiving, by a first cloud service, a first request message from a second cloud service, the first request message including an identifier of the joining device to commission to the Matter network;

sending, to the second cloud service, a second request message to open a commissioning window for the joining device, the sending causing the second cloud service to send a message to the joining device to cause the joining device to open the commissioning window;

receiving, from the second cloud service, an onboarding payload;

forwarding the onboarding payload to a hub node, the forwarding causing the hub node to commission the joining device to the Matter network; and receiving, from the hub node, an indication of completion of the commissioning the joining device.

Example 2: The method of example 1, wherein the first request message includes an indication that the joining device is upgradeable to join the Matter network, the method further comprising:

storing the received identifier of the joining device and the indication that the joining device is upgradeable to join the Matter network in a home graph of a fabric network managed by the first cloud service; and scanning the home graph to identify devices that are upgradeable to join the Matter network.

Example 3: The method of example 2, further comprising:

responsive to the scanning the home graph identifying that the joining device is upgradeable to join the Matter network, sending the second request message to open the commissioning window for the joining device.

Example 4: The method of example 2 or example 3, wherein the scanning the home graph to identify devices that are upgradeable to join the Matter network comprises:

periodically scanning the home graph to identify devices that are upgradeable to join the Matter network.

Example 5: The method of any one of the preceding examples, wherein the first request message includes:

a matterUniqueId;

a matterOriginalVendorId;

a matterOriginalProductId; and a MatterUpgradeable trait.

Example 6: The method of any one of the preceding examples, wherein the first cloud service manages a network fabric associated with the Matter network.

Example 7: The method of any one of the preceding examples, wherein the joining device is a partner device and wherein the second cloud service is a partner cloud service that manages devices manufactured by a partner device manufacturer.

Example 8: An apparatus configured to provide a first cloud service comprising:

a network interface;

one or more processors; and memory comprising instructions executable by the one or more processor to configure the first cloud service to:

receive a first request message from a second cloud service, the first request message including an identifier of a joining device to commission to a Matter network;

send, to the second cloud service, a second request message to open a commissioning window for the joining device, the sending causing the second cloud service to send a message to the joining device to cause the joining device to open the commissioning window;

receive, from the second cloud service, an onboarding payload;

forward the onboarding payload to a hub node, the forwarding causing the hub node to commission the joining device to the Matter network; and receive, from the hub node, an indication of completion of the commissioning the joining device.

Example 9: The first cloud service of example 8, wherein the first request message includes an indication that the joining device is upgradeable to join the Matter network, the instructions further executable to configure the first cloud service to:

store the received identifier of the joining device and the indication that the joining device is upgradeable to join the Matter network in a home graph of a fabric network managed by the first cloud service; and scan the home graph to identify devices that are upgradeable to join the Matter network.

Example 10: The first cloud service of example 9, the instructions further executable to configure the first cloud service to:

responsive to the scan of the home graph identifying that the joining device is upgradeable to join the Matter network, send the second request message to open the commissioning window for the joining device.

Example 11: The first cloud service of example 9 or example 10, the instructions to scan the home graph to identify devices that are upgradeable to join the Matter network are further executable to configure the first cloud service to:

periodically scan the home graph to identify devices that are upgradeable to join the Matter network.

Example 12: The first cloud service of any one of examples 8 to 11, wherein the first request message includes:

a matterUniqueId;

a matterOriginalVendorId;

a matterOriginalProductId; and a MatterUpgradeable trait.

Example 13: The first cloud service of any one of examples 8 to 12, wherein the first cloud service manages a network fabric associated with the Matter network.

Example 14: The first cloud service of any one of examples 8 to 13, wherein the joining device is a partner device and wherein the second cloud service is a partner cloud service that manages devices manufactured by a partner device manufacturer.

Example 15: A non-transitory computer-readable storage medium comprising instructions for a first cloud service application, the instructions executable by one or more processors, to configure the application to perform a method as recited in any one of examples 1 to 7.

Example 16: A system comprising:

an apparatus according to any of examples 8 to 14;

a second apparatus configured to provide the second cloud service;

the joining device; and the hub node.

Example 17: Software code comprising instructions which, when executed, cause:

a first cloud service to receive a first request message from a second cloud service, the first request message including an identifier of a joining device to commission to a Matter network;

the first cloud service to send to the second cloud service, a second request message to open a commissioning window for the joining device;

the second cloud service, in response to receiving the second request message, to send a message to the joining device;

the joining device, in response to receiving the message sent to the joining device by the second cloud service, to open the commissioning window;

the first cloud service to receive, from the second cloud service, an onboarding payload;

the first cloud service to forward the onboarding payload to a hub node;

the hub node, in response to receiving the onboarding payload, to commission the joining device to the Matter network; and the first cloud service to receive, from the hub node, an indication of completion of the commissioning the joining device.

Although aspects of upgrading legacy devices to Matter have been described in language specific to features and/or methods, the subject of the appended claims is not necessarily limited to the specific features or methods described. Rather, the specific features and methods are disclosed as example implementations of upgrading legacy devices to Matter, and other equivalent features and methods are intended to be within the scope of the appended claims. Further, various different aspects are described, and it is to be appreciated that each described aspect can be implemented independently or in connection with one or more other described aspects.

What is claimed is:

1. A method of commissioning a joining device to a Matter network, the method comprising:

receiving, by a first cloud service, a first request message from a second cloud service, the first request message including an identifier of the joining device to commission to the Matter network;

sending, by the first cloud service to the second cloud service, a second request message to open a commissioning window for the joining device, the sending causing the second cloud service to send a message to the joining device to cause the joining device to open the commissioning window;

receiving, by the first cloud service from the second cloud service, an onboarding payload;

forwarding, by the first cloud service, the onboarding payload to a hub node, the forwarding causing the hub node to commission the joining device to the Matter network; and receiving, by the first cloud service from the hub node, an indication of completion of the commissioning of the joining device.

2. The method of claim 1, wherein the first request message includes an indication that the joining device is upgradeable to join the Matter network, the method further comprising:

storing, by the first cloud service, the received identifier of the joining device and the indication that the joining device is upgradeable to join the Matter network in a home graph of a fabric network managed by the first cloud service; and scanning, by the first cloud service, the home graph to identify devices that are upgradeable to join the Matter network.

3. The method of claim 2, further comprising:

responsive to the scanning of the home graph identifying that the joining device is upgradeable to join the Matter network, sending, by the first cloud service, the second request message to open the commissioning window for the joining device.

4. The method of claim 2, wherein the scanning the home graph to identify devices that are upgradeable to join the Matter network comprises:

periodically scanning the home graph to identify devices that are upgradeable to join the Matter network.

5. The method of claim 1, wherein the first request message includes:

a matterUniqueId;

a matterOriginalVendorId;

a matterOriginalProductId; and a MatterUpgradeable trait.

6. The method of claim 1, wherein the first cloud service manages a network fabric associated with the Matter network.

7. The method of claim 1, wherein the joining device is a partner device and wherein the second cloud service is a partner cloud service that manages devices manufactured by a partner device manufacturer.

8. An apparatus configured to provide a first cloud service comprising:

a network interface;

one or more processors; and memory comprising instructions executable by the one or more processors to configure the first cloud service to:

receive a first request message from a second cloud service, the first request message including an identifier of a joining device to commission to a Matter network;

send, to the second cloud service, a second request message to open a commissioning window for the joining device, the sending causing the second cloud service to send a message to the joining device to cause the joining device to open the commissioning window;

receive, from the second cloud service, an onboarding payload;

forward the onboarding payload to a hub node, the forwarding causing the hub node to commission the joining device to the Matter network; and receive, from the hub node, an indication of completion of the commissioning of the joining device.

9. The apparatus of claim 8, wherein the first request message includes an indication that the joining device is upgradeable to join the Matter network, the instructions further executable to configure the first cloud service to:

store the received identifier of the joining device and the indication that the joining device is upgradeable to join the Matter network in a home graph of a fabric network managed by the first cloud service; and scan the home graph to identify devices that are upgradeable to join the Matter network.

10. The apparatus of claim 9, the instructions further executable to configure the first cloud service to:

responsive to the scan of the home graph identifying that the joining device is upgradeable to join the Matter network, send the second request message to open the commissioning window for the joining device.

11. The apparatus of claim 9, the instructions to scan the home graph to identify devices that are upgradeable to join the Matter network are further executable to configure the first cloud service to:

periodically scan the home graph to identify devices that are upgradeable to join the Matter network.

12. The apparatus of claim 8, wherein the first request message includes:

a matterUniqueId;

a matterOriginalVendorId;

a matterOriginalProductId; and a MatterUpgradeable trait.

13. The apparatus of claim 8, wherein the first cloud service manages a network fabric associated with the Matter network.

14. The apparatus of claim 8, wherein the joining device is a partner device and wherein the second cloud service is a partner cloud service that manages devices manufactured by a partner device manufacturer.

15. A non-transitory computer-readable storage medium comprising instructions for a first cloud service application of a first cloud service, the instructions executable by one or more processors, to configure the application to;

receive a first request message from a second cloud service, the first request message including an identifier of a joining device to commission to a Matter network;

send, to the second cloud service, a second request message to open a commissioning window for the joining device, the sending causing the second cloud service to send a message to the joining device to cause the joining device to open the commissioning window;

receive, from the second cloud service, an onboarding payload;

forward the onboarding payload to a hub node, the forwarding causing the hub node to commission the joining device to the Matter network; and receive, from the hub node, an indication of completion of the commissioning of the joining device.

16. The non-transitory computer-readable storage medium of claim 15, wherein the first request message includes an indication that the joining device is upgradeable to join the Matter network, the instructions further executable to configure the application to:

store the received identifier of the joining device and the indication that the joining device is upgradeable to join the Matter network in a home graph of a fabric network managed by the first cloud service; and scan the home graph to identify devices that are upgradeable to join the Matter network.

17. The non-transitory computer-readable storage medium of claim 16, the instructions further executable to configure the application to:

responsive to the scan of the home graph identifying that the joining device is upgradeable to join the Matter network, send the second request message to open the commissioning window for the joining device.

18. The non-transitory computer-readable storage medium of claim 16, wherein the instructions to scan the home graph to identify devices that are upgradeable to join the Matter network are further executable to configure the application to:

periodically scan the home graph to identify devices that are upgradeable to join the Matter network.

19. The non-transitory computer-readable storage medium of claim 15, wherein the first request message includes:

a matterUniqueId;

a matterOriginalVendorId;

a matterOriginalProductId; and a MatterUpgradeable trait.

20. The non-transitory computer-readable storage medium of claim 15, wherein the first cloud service manages a network fabric associated with the Matter network.

<p align="center">* * * * *</p>